Jan. 28, 1941.   N. F. ADAMSON ET AL   2,229,910
CLUTCH
Filed May 10, 1939   2 Sheets-Sheet 2

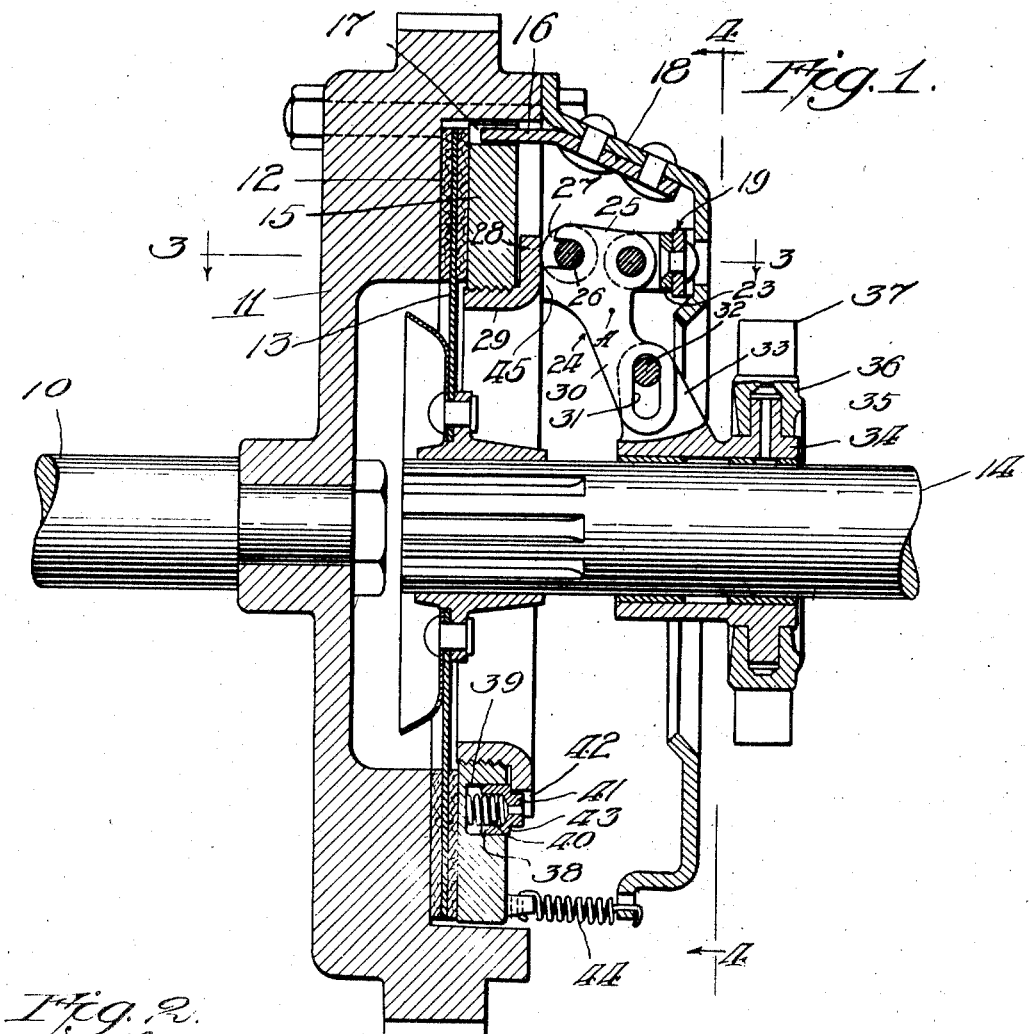
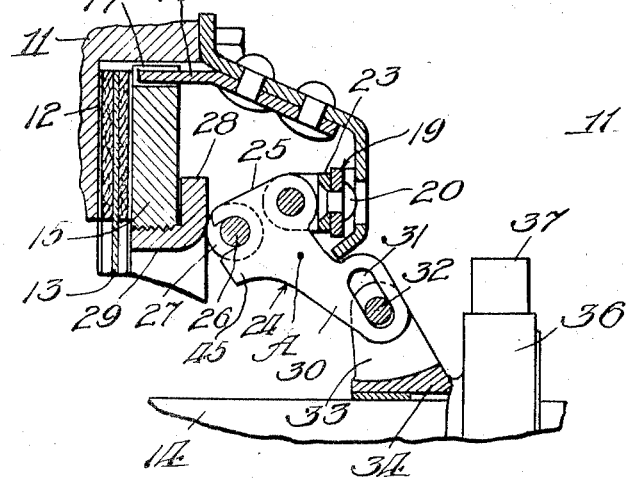
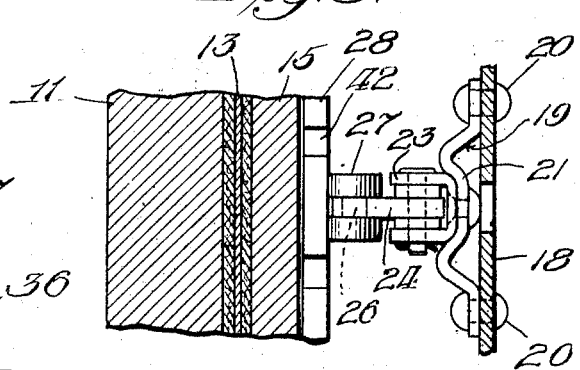

Inventors:
Kay L. Bastrup and
Nicholas F. Adamson
by Davis, Lindsey, Smith & Shonts
Attys Patented Jan. 28, 1941

2,229,910

UNITED STATES PATENT OFFICE 2,229,910

CLUTCH

Nicholas F. Adamson and Kay L. Bastrup, Racine, Wis., assignors to Twin Disc Clutch Company, Racine, Wis., a corporation of Wisconsin Application May 10, 1939, Serial No. 272,768

7 Claims. (Cl. 192—68)

Our invention relates to clutches and more particularly to that type in which engagement is effected by a mechanical actuation of the component elements in contrast to spring loading.

One object of our invention is to devise a clutch of the over-center type which is maintained in an engaged or disengaged position by the effect of centrifugal force on the operating mechanism.

A further object is to provide a clutch in which the operating mechanism is characterized by a measure of flexibility that substantially avoids rigidity in the clutch action, and compensates for minor wear between major adjustments of the clutch and for expansion and contraction effects due to variations in operating temperatures.

These and further objects of our invention will be set forth in the following specification, reference being had to the accompanying drawings, and the novel means by which said objects are effectuated will be definitely pointed out in the claims.

In the drawings:

Fig. 1 is a sectional elevation of the clutch in an engaged position.

Fig. 2 is a fragmentary, sectional elevation of the clutch when disengaged as viewed in Fig. 1.

Fig. 3 is a section along the line 3—3 in Fig. 1, looking in the direction of the arrows.

Figure 4:
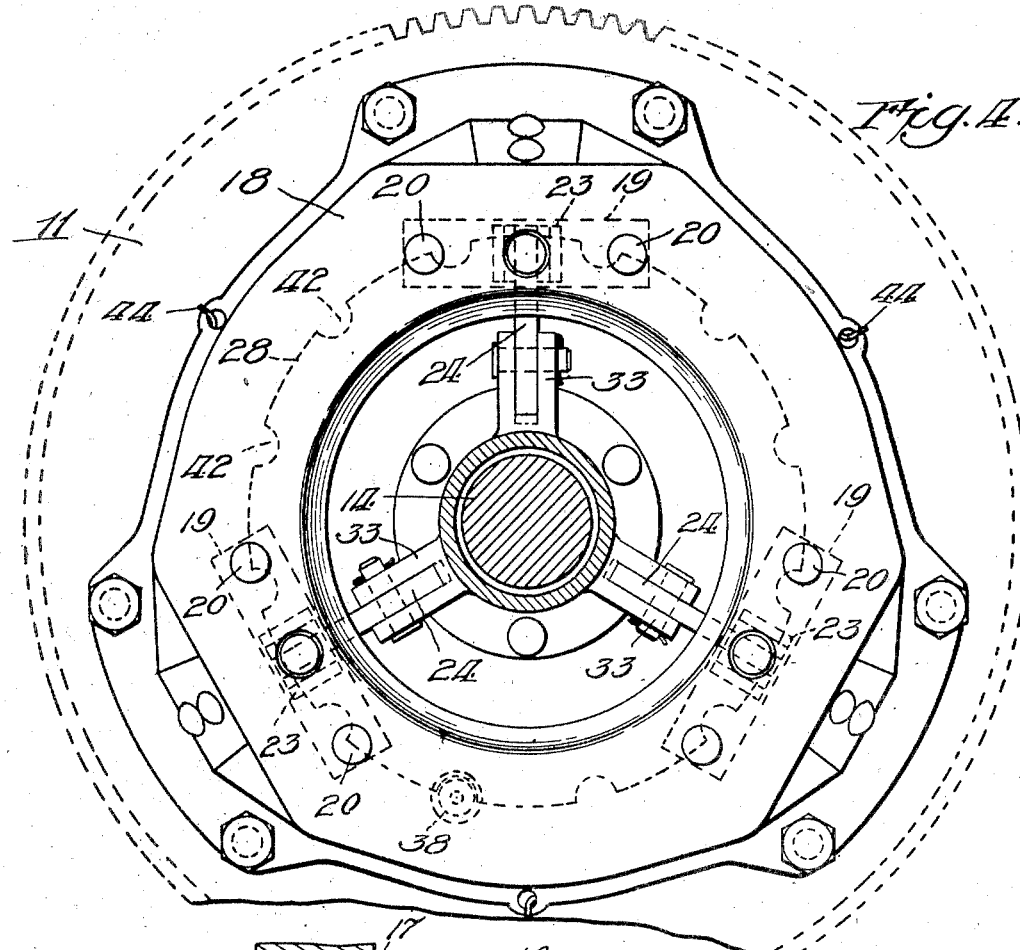
Fig. 4 is a section along the line 4—4 of Fig. 1, looking in the direction of the arrows, and showing an end or axial view of the clutch.

Referring to the drawings and more particularly to Fig. 1, the numeral 10 designates a driving shaft having mounted thereon a flywheel 11 which is counterbored to provide an operating face 12. The flywheel functions as the member of the clutch that is held against axial movement and the face 12 engages an annulus of friction material secured to the adjacent side of a driven plate 13 that is splinedly connected to a driven shaft 14 so that the plate 13 rotates therewith, but is capable of axial movement relative thereto. It will be understood that the terms "driving" and "driven," as applied to the shafts 10 and 14, respectively, are merely illustrative, since the direction of drive may be reversed without affecting the clutch construction hereinafter described.

The friction annulus on the opposite side of the plate 13 is engaged by the adjacent side of a pressure plate 15 which is drivably connected to the flywheel by means of a plurality of circumferentially spaced tongues 16, one end of each tongue being received within a slot 17 cut inwardly from the periphery of the plate 15 and the opposite end being secured to a cover plate 18 that is secured to the flywheel and slightly offset therefrom to provide a housing for the operating mechanism presently described.

This mechanism takes the form of a number of lever devices, of which three are illustrated in the drawings, but since each of these devices are identical, it will only be necessary to describe a single mechanism.

A spring strap 19 is secured at its ends by rivets 20 to the inner face of the cover plate 18 and the intermediate portion 21 of this strap is spaced from the cover plate to provide a spring abutment or fulcrum for the clutch levers. The strap 19 is bowed away from the cover plate between the intermediate portion 21 and each end of the strap in order to provide the relief required by the tendency of the strap to move endwise from the intermediate portion when flexed, as hereinafter described.

A U-shaped bracket 23 is secured to the intermediate portion 21 and pivotally mounted between the limbs of this bracket is a lever 24 having an arm 25 which extends toward the pressure plate 15. The free end of the arm 25 is bifurcated to receive the reduced central portion 26 of a dual roller 27 which rides along and abuts an annular flange 28 formed on an adjusting ring 29 that is threaded internally of the pressure plate 15.

The other lever arm 30 extends inwardly toward the driven shaft 14, when the parts are occupying the position illustrated in Fig. 1, and it includes an elongated slot 31 within which operates a pin 32 that is mounted on an arm 33. This arm forms part of an actuating sleeve 34 that is slidable along the shaft 14 and which incorporates an annular flange 35 embraced by an operating collar 36 having a pair of trunnions 37 for engagement by the usual shifting fork (not shown).

The ring 29 provides a medium for adjusting the clutch as the facings on the plate 13 wear and as required by the fact that the levers 24 are characterized by a constant throw. The adjusted position of the ring 29 is maintained by a plunger 38 that is slidably mounted in a pocket 39 provided in the pressure plate 15. The plunger is hollow and is normally urged toward the right, as viewed in Fig. 1, by a helical spring 40, one end of which abuts against the base of the pocket and the other against the plunger. The latter is provided with a reduced head 41 which is received within any one of a plurality of equally spaced arcuate pockets 42 provided in the periphery of the adjusting ring flange 28. A shoulder 43 is formed on the plunger 38 and normally contacts the inner surface of the flange 28 to limit outward movement of the plunger under the impulse of the spring 40. A plurality of release springs 44 connect the pressure and cover plates 15 and 18, respectively, and these springs are under constant tension when the clutch is engaged, so that when the levers 24 are moved to a released position, the springs 44 assist in retracting the plate 15 and maintain contact of the latter plate and rollers 27.

As already noted, Fig. 1 shows the clutch in an engaged position and, in this relation of parts, the radial distance of the pintle 26 from the axis of the shaft 14 is greater than the similar distance of the pivot of the lever 24 from the same axis, or, in other words, the lever 24 has been moved to an over-center position and is thus effectively locked against disengagement. This locking is assisted by the retracting pull of the release springs 44 and also by the fact that since the center of gravity A of the lever 24 is located to the left of the lever pivot, as viewed in Fig. 1, centrifugal force also acts to maintain the lever in engaged position. Each lever is provided with a nose 45 which contacts the flange 28 to prevent further rotation of the associated lever in a clockwise direction, as viewed in Fig. 1.

To release the clutch, it is merely necessary to move the actuating sleeve 34 toward the right, as viewed in Fig. 1, whereupon the lever 24 will be rocked in a counterclockwise direction to the position illustrated in Fig. 2. This rocking is facilitated by the yieldable fulcrum afforded by the spring strap 19. In the released position, the center of gravity of each lever 24 is positioned on the right of the lever pivot, as viewed in Fig. 2, so that centrifugal force acts to hold the lever in this position.

When the clutch is engaged, the lever 24 is moved in a clockwise direction by shifting the sleeve 34 toward the left and the ensuing axial movement of the pressure plate 15 to clamping position is effected by pressure of the roller 27 against the flange 28, the lever fulcruming on the bracket 23 which, in turn, is based on the spring strap 19. This construction provides a yieldable fulcrum for the lever and constitutes a very important part of our invention. The strap 19 materially lessens the number of adjustments of the ring 29, whether due to wear of the friction facings on the plate 13 or wear of other parts, since, within the range of movement of the strap, it effectively compensates for such wear. The strap also compensates for variations in operating temperatures and the entire operating mechanism is characterized by a greater ease of actuation.

As the clutch facings wear, adjustment of the clutch is easily effected by depressing the plunger 38 sufficient to free the adjusting ring 29 for rotation, whereupon this ring can be retracted toward the right, as viewed in Fig. 1 to maintain the desired contact with the roller 27. This adjustment does not require any special tool.

Our improved clutch construction is such that it may be easily mounted upon a flywheel, or other rotary part, and with the major portion of its operating mechanism substantially housed within the cover plate 18 so that it is characterized by a high safety factor. Furthermore, since centrifugal force operates to maintain the levers 24 in either engagement or disengagement, no special provision is required to hold the levers in either of the indicated positions, although, so long as the release springs 44 are operative, these springs assist in the indicated action.

Figure 5:
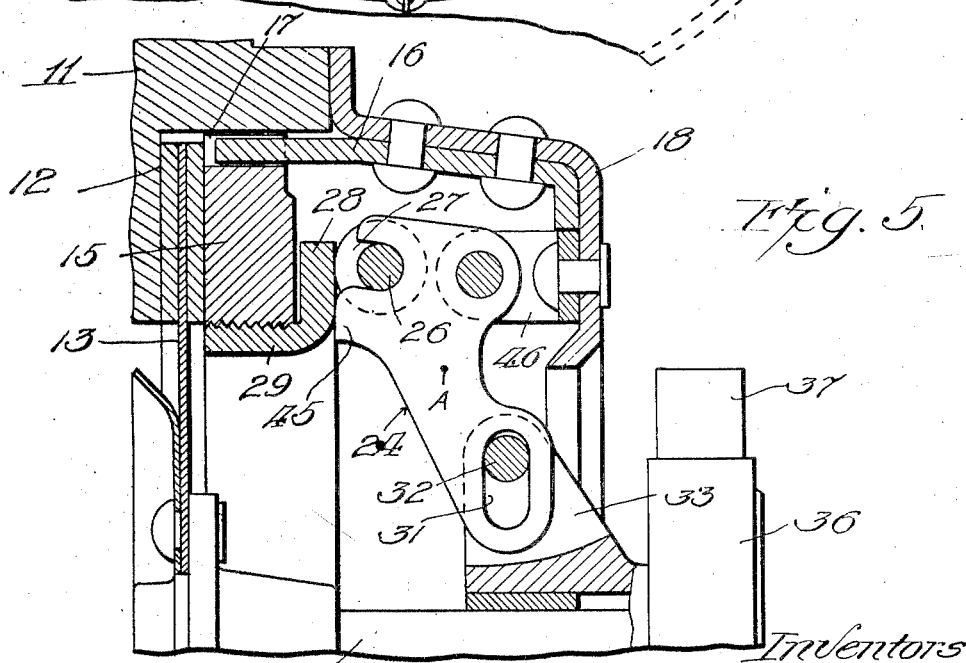
Fig. 5 is an enlarged, fragmentary, sectional elevation showing a modification of the structure illustrated in Fig. 1.

The modification illustrated in Fig. 5 differs from that described above only in that the U-shaped bracket 46, corresponding to the bracket 23, is mounted directly on the cover plate 18. The remainder of the clutch construction is identical with that heretofore described. The operation of this modification is somewhat more rigid than that illustrated in Fig. 1, since the movement of the levers to over-center position require a slight "give" in the different portions of the clutch, including the cover plate and the friction facings on the driven plate.

We claim:

1. In a clutch, the combination of clutch devices connectible to separate rotary parts, a pressure member connected to one of the devices and shiftable to drivably connect both devices, a leaf spring carried by one of the devices in opposed relation to the pressure member, a lever mounted on an intermediate movable portion of the spring and having an arm for engaging the member, and means for rocking the lever on the spring as a fulcrum to cause the arm to move the member to driving position.

2. In a clutch, the combination of clutch devices connectible to separate rotary parts, a pressure plate connected to one of the devices and shiftable to drivably connect both devices, a cover plate fixedly carried by one of the devices, a leaf spring fixed at its ends to the cover plate and intermediately spaced therefrom, the spring having curved portions at the ends of the intermediate portion to compensate for the tendency of the spring to move endwise when flexed, a lever pivoted on the spring and having an arm for engaging the pressure plate, and means for rocking the lever on the spring as a fulcrum to cause the arm to move the pressure plate to driving position.

3. In a clutch, the combination of a pair of clutch devices, a pressure plate connected to one of the devices and shiftable to drivably connect both devices, and means for moving the plate to engaging position comprising a resilient member and a lever interposed between the pressure plate and one of the devices, the resilient member abutting said one device in the direction of flexure and the lever being pivoted on the member and having a portion for engaging the pressure plate, the rocking of the lever on the member as a fulcrum moving the plate to driving position.

4. In a clutch, the combination of a pair of clutch devices, a pressure plate connected to one of the devices and shiftable to drivably connect both devices, and means for moving the plate to engaging position comprising a leaf spring and a lever interposed between the pressure plate and one of the devices, the ends of the spring abutting said one device and the intermediate portion being spaced therefrom and the lever being mounted on the portion and having a part for engaging the pressure plate, the rocking of the lever on the spring as a fulcrum moving the plate to driving position.

5. Actuating mechanism for a pair of clutch elements forming the gripping portions of a clutch comprising a resilient member abutting one of the elements in the direction of flexure, and lever means pivoted on the member and engageable with the other clutch element to clamp the elements together against the member as a fulcrum.

6. In a clutch, the combination of clutch devices connectible to separate rotary parts, a pressure member connected to one of the devices and shiftable to drivably connect both devices, a leaf spring fixed at its ends to one of the devices and intermediately spaced therefrom and located in opposed relation to the pressure member, the spring having relieving portions at the ends of the intermediate portion to compensate for the tendency of the spring to move endwise when flexed, a lever mounted on the spring and having an arm for engaging the pressure member, and means for rocking the lever on the spring as a fulcrum to cause the arm to move the pressure member to driving position.

7. Actuating mechanism for a pair of clutch elements forming the gripping portions of a clutch comprising a leaf spring fixed at its ends to one of the elements and intermediately spaced therefrom, the spring having relieving portions at the ends of the intermediate portion to compensate for the tendency of the spring to move endwise when flexed, and lever means mounted on the spring and engageable with the other clutch element to clamp the elements together against the spring as a fulcrum.

KAY L. BASTRUP.
NICHOLAS F. ADAMSON.